US011421645B1

(12) United States Patent
Suddaby (10) Patent No.: US 11,421,645 B1
(45) Date of Patent: Aug. 23, 2022

(54) KINETIC ENERGY CAPTURE, STORAGE, AND CONVERSION DEVICE

(71) Applicant: Loubert S. Suddaby, Orchard Park, NY (US)

(72) Inventor: Loubert S. Suddaby, Orchard Park, NY (US)

(*) Notice: Subject to any disclaimer, the term of this patent is extended or adjusted under 35 U.S.C. 154(b) by 0 days.

(21) Appl. No.: 17/221,059

(22) Filed: Apr. 2, 2021

(51) Int. Cl.
*F03B 13/22* (2006.01)
*F03B 13/20* (2006.01)

(52) U.S. Cl.
CPC .............. *F03B 13/22* (2013.01); *F03B 13/20* (2013.01); *F05B 2250/44* (2020.08); *F05B 2260/4022* (2013.01); *F05B 2260/4031* (2013.01)

(58) Field of Classification Search
CPC ...... F03B 13/22; F03B 13/20; F05B 2250/44; F05B 2260/4022; F05B 2260/4031
See application file for complete search history.

(56) References Cited

U.S. PATENT DOCUMENTS

| | | | |
|---|---|---|---|
| 4,228,360 A | 10/1980 | Navarro | |
| 8,786,121 B1 | 7/2014 | Peng | |
| 2010/0038913 A1 | 2/2010 | Svelund | |
| 2012/0119503 A1 | 5/2012 | van Breems | |
| 2014/0346776 A1* | 11/2014 | Park | F01D 15/10 290/52 |
| 2016/0153422 A1 | 6/2016 | Hench | |
| 2016/0177912 A1 | 6/2016 | Gerami | |
| 2016/0380507 A1* | 12/2016 | Utkin | F03G 1/02 310/74 |
| 2018/0163706 A1* | 6/2018 | Kase | F16D 43/202 |

FOREIGN PATENT DOCUMENTS

DE 102014009843 12/2015

* cited by examiner

*Primary Examiner* — Viet P Nguyen
(74) *Attorney, Agent, or Firm* — Harter Secrest & Emery LLP; Michael Nicholas Vranjes (57) ABSTRACT

An energy capture, storage, and conversion device, including a housing, a rotor rotatably arranged in the housing, a stator fixedly secured to the housing and concentrically arranged around the rotor, a spring arranged in the housing and connected to the rotor, and an oscillating weight assembly operatively arranged in the housing to wind the spring.

12 Claims, 5 Drawing Sheets

KINETIC ENERGY CAPTURE, STORAGE, AND CONVERSION DEVICE

FIELD

The present disclosure relates to kinetic energy capture and storage devices, and more particularly, to an energy capture and storage device that utilizes an oscillating or rotating weight to transform kinetic energy into electrical energy.

BACKGROUND

Wind and wave energy represent the terrestrial conversion of solar electromagnetic radiation into kinetic energy. Large land and water masses absorb solar radiation, which imparts energy, generally transformed to heat which in turn, animates molecules. Adjacent air molecules absorb the radiant thermal energy, increase their own kinetic energy and rise, creating convection currents and turbulence often manifested as wind. Over expansive land and water masses, large amounts of air can be set in motion and are manifested in potentially powerful telluric embodiments of energy that we know as wind and waves. While there is a significant push to capture solar energy directly via man made solar panels, it is hard to imagine the sheer numbers of such inefficient capture mechanisms that would be required to compete with the vast amount of kinetic energy already transformed from the sun by the earth's surface alone.

One of the biggest challenges in capture of this kinetisized solar energy resides in the unpredictability of wind and wave motion which is as a trustworthy as the weather. A second concern is that gusts of wind and changing crests of waves must be converted to stable rotary motion to be able to generate a suitable supply of electricity. Finally, any energy capture device capable of capturing wind and wave energy must be practical in terms of cost to build, cost to deploy, and cost to maintain.

Thus, there is a long felt need for a kinetic energy capture and storage device which is simple to manufacture and permits simultaneous energy capture, energy storage, and energy conversion capabilities using a simple oscillating or rotating weight, a spring, and a magnet.

SUMMARY

According to aspects illustrated herein, there is provided an energy capture and storage device, comprising a housing, a rotor rotatably arranged in the housing, a stator fixedly secured to the housing and concentrically arranged around the rotor, a spring arranged in the housing and connected to the rotor, and an oscillating weight assembly operatively arranged in the housing to wind the spring.

In some embodiments, the device further comprises a case arranged to at least partially enclose the spring, wherein the spring comprises a distal end connected to the case and a proximate end connected to the oscillating weight assembly. In some embodiments, the case is to non-rotatably connected to the rotor. In some embodiments, the distal end is connected to the case via a clutch. In some embodiments, the device further comprises a gear train operatively arranged to non-rotatably connect the case to the rotor. In some embodiments, the device further comprises a brake operatively arranged to removably engage the rotor. In some embodiments, the device further comprises a computing device operatively arranged to control the brake. In some embodiments, the housing is buoyant. In some embodiments, the oscillating weight assembly comprises an oscillating weight, a shaft connected to the spring, and an arm pivotably connected to the oscillating weight, the arm operatively arranged to displace the shaft in a first circumferential direction. In some embodiments, the oscillating weight assembly further comprising a gear non-rotatably connected to the shaft, the arm comprises a first portion and a second portion spaced apart from the first portion, and the first portion and the second portion are engaged with the gear to displace the shaft only in the first circumferential direction. In some embodiments, the oscillating weight assembly further comprises a reciprocating element pivotably connected to the arm, and a chain non-rotatably connecting the reciprocating element to the shaft. In some embodiments, the reciprocating element comprises a first pawl and a second pawl engaged with the chain to displace the chain/shaft only in the first direction. In some embodiments, the oscillating weight assembly comprises an oscillating weight, a plurality of gears including a first plurality of teeth and a second plurality of teeth, a shaft connected to the spring, a first pawl connected to the oscillating weight and operatively arranged to engage the first plurality of teeth to displace the shaft in a first circumferential direction, and a second pawl connected to the oscillating weight and operatively arranged to engage the second plurality of teeth to displace the shaft in the first circumferential direction.

According to aspects illustrated herein, there is provided an energy capture and storage device, comprising a housing operatively arranged to float in water, a rotor rotatably arranged in the housing, a stator fixedly secured to the housing and concentrically arranged around the rotor, a case rotatably arranged in the housing, the case being non-rotatably connected to the rotor, a coil spring including a distal end connected to the case and a proximate end, and an oscillating weight assembly arranged in the housing, the oscillating weight assembly being connected to the proximate end and operatively arranged to wind the spring.

In some embodiments, the distal end is connected to the case via a clutch. In some embodiments, the oscillating weight assembly comprises an oscillating weight, a shaft connected to the spring, and an arm pivotably connected to the oscillating weight, the arm operatively arranged to displace the shaft in a first circumferential direction. In some embodiments, the oscillating weight assembly further comprising a gear non-rotatably connected to the shaft, the arm comprises a first portion and a second portion spaced apart from the first portion, and the first portion and the second portion are engaged with the gear to displace the shaft only in the first circumferential direction. In some embodiments, the oscillating weight assembly further comprises a reciprocating element pivotably connected to the arm, and a chain non-rotatably connecting the reciprocating element to the shaft. In some embodiments, the reciprocating element comprises a first pawl and a second pawl engaged with the chain to displace the shaft only in the first direction. In some embodiments, the oscillating weight assembly comprises an oscillating weight, a plurality of gears including a first plurality of teeth and a second plurality of teeth, a shaft connected to the spring, a first pawl connected to the oscillating weight and operatively arranged to engage the first plurality of teeth to displace the shaft in a first circumferential direction, and a second pawl connected to the oscillating weight and operatively arranged to engage the second plurality of teeth to displace the shaft in the first circumferential direction.

According to aspects illustrated herein, there is provided an energy capture device utilizing an oscillating mass to convert kinetic energy into elastic potential energy which can then be stored, modulated, and released to drive a dynamo thereby generating electrical energy to supply an electrical grid.

It is an object of the present disclosure to provide for a simple shore-based or offshore mechanism to capture wave energy, which is in essence, wind energy manifested by convection currents formed in atmospheric air. It should be recognized that direct wind capture could also be employed by the device, but since wave energy is a concentrated form of solar energy abetted by the wind, focusing on waves directly in a manner, cuts out the middleman.

In some embodiments, shore based capture is preferred for ease of deployment and maintenance of the device and because captured energy must ultimately be transferred to land to be effectively utilized. By having a device that simultaneously captures, converts, and stores energy most issues are addressed such that a constant and seamless supply of energy can be imported to the existing power grid.

To achieve these objectives, a circular device, for example, measuring ten meters in diameter and three meters in height is conceived. The device shall displace a sufficient volume of water to allow it to float and be agitated by oscillatory wave motion. In some embodiments, the device shall be deployed from shore by a jointed mechanical arm which is attached to the superior surface in a polyaxial fashion thereby permitting absorption of all ranges of oscillatory motion. The base of the arm will be attached to a breaker or a pier that will allow the device to be lifted onto the pier or land to permit servicing and redeployment. This feature will also allow removal of the device from the ocean for safety in extreme weather.

Oscillatory energy is harvested by an internally contained rotor or semi-circular weight which can rotate in 360 degrees, such movement dependent on the rocking motion of passing waves. This weighted rotor in turn winds a large coil spring contained therein, which, in some embodiments, would be made of fiberglass, plastic elastomers, or metal designed to thwart the corrosive effects of sea water.

The coil spring, in turn is contained within and attached to a cylindrical case with a ring of gear teeth about its circumference. The toothed case turns on the axel and is powered by the elastomeric coil spring by virtue of an attachment securing the spring to the barrel at its outer end.

The perimeter teeth of the rotating case engage a gear or gears designed to turn a final gear. The final gear turns more rapidly and contains magnets, thus serving as an electromagnetic rotor. The rotor gear spins within a surrounding stator of copper coils such that the spinning magnets contained within the rotor will generate the movement of electrons in the copper wire of the stator.

To prevent the spring from rapidly unloading all of its stored energy to the electromagnetic rotor, the speed of the rotor is controlled by a computer assisted electromagnetic break which keeps it spinning at a suitable and constant rate of revolution necessary to generate an electric current. This computer assistance may be as simple as that employed in a quartz watch. To prevent the coil spring from being wound too tightly, its attachment to the cylindrical case shall employ a clutch mechanism, such as a friction clutch or electromagnetic clutch to prevent spring damage.

Henceforth, as the device is agitated by wave oscillations, the internal semi-circular weight rotates and turns an axial pivot gear mechanism which employs a ratcheting reverser mechanism which permits energy transfer to the coil spring via both clockwise and counterclockwise rotations.

In some embodiments, the pivot gear mechanism alternatively pushes and pulls a pair of levers with end pawls designed to rotate another gear in a unidirectional fashion. In some embodiments, the pivot gear mechanism operates a piston containing external pawls that engage a chain which, in turn, rotates the spring winding gear in a unidirectional fashion. In some embodiments, other one-way clutch mechanisms could be employed to transform oscillatory motion into unidirectional rotary motion sufficient to wind a coil spring.

The kinetic energy captured is stored in an elastomeric spring which in turn imparts energy to an externally toothed rotor. A friction or electromagnetic slip clutch arrangement is employed between the distal spring end and the rotor to prevent excessive spring tension and concomitant spring damage.

Energy contained or stored in the spring rotor causes it to impel the outer case to rotate the circumferentially located teeth. The teeth engage a gear, which transfers motion by virtue of a gear train to an electromagnetic rotor which spins within a stator to generate electricity, akin to various turbines known in the art. The speed of the electromagnetic rotor is optimized by an electromagnetic brake which in turn is modulated by a computer. In this fashion, kinetic energy which oscillates the device is continuously captured, stored, and converted to electricity in a seamless fashion. The device simply has to be agitated by wind or wave kinetic energy to be operational. In this sense, it could also be used as an offshore point absorber rocked by wind or waves, a shoreline device in a moving body of water or a shore-based device on a breaker or a pier. Indeed, any kinetic energy source could be employed.

By utilizing the device in conjunction with a mechanical arm, the mechanism can be deployed and retracted as needed to prevent damage from excessive wave energy and to conduct routine maintenance. By employing multiple devices along the side of piers or breaker walls or by increasing device diameter and size, increasing amounts of energy can be captured and converted. By using material components which are corrosion resistant, device life and maintenance can be economically optimized. Depending on the amount of shoreline available, scalable energy capture and conversion can be accomplished.

The energy capture and storage device comprises a pivot gear mechanism that transfers energy from the oscillating weight to a ratchet wheel and coil spring. In some embodiments, the pivot gear mechanism includes a lever pawl system to convert the oscillating weight random circular motion into a consistent clockwise motion that can be used to wind the spring. In some embodiments, the pivot gear mechanism includes a reciprocating element (similar to a piston) including pawls on the side thereof. The pawls engage a chain such that displacement of the reciprocating element in a first direction cause the chain to rotate in a first rotational direction and displacement of the reciprocating element in a second direction, opposite the first direction, causes the chain to rotate in the first rotational direction. The reciprocating element need not be round like a vehicle engine piston. For example, the reciprocating element may be flat with a thickness no greater than the chain it impels. In some embodiments, the chain is enclosed in a housing. The housing allows the chain to be pushed/pulled thereby causing flexion in one or more the chain links and detach from its sprockets. This design allows both the forward and backward displacement of the reciprocating element or strut to be captured and allows a more efficient energy capture than on one piston power stroke alone. In some embodiments, the housing contains the entire circumference of the chain even though the push side of the chain is the side at risk of flexing. The housing will aid in containing lubricating grease for the chain to reduce friction and retard the corrosive aspects of sea water. The pawls will have a spring bias to allow them to fold into the reciprocating element wall on the stroke portion opposite their own power stroke (i.e., one pawl will consistently push and the other pawl will pull). The chain links should remain taut.

In some embodiments, a rigid chain can be used, for example, SERAPID® rigid chains. In such embodiments, the rigid chain will engage the pawls of the reciprocating element without the need for a housing therearound. Since rigid chains do not have links that will flex and disengage a sprocket.

In some embodiments, the coil spring may comprise a metal, plastic, or fiberglass and is wound by a pivotal rotor weight. In some embodiments, the coil spring is surrounded by a power barrel or case including circumferentially and externally arranged teeth. A small gear hub engages the barrel teeth and turns an attached larger gear. The larger gear turns a glide wheel, which is optimized by a frictionless electromagnetic brake which is computer controlled. The electromagnetic brake may also be quartz crystal controlled. The glide wheel contains magnets (rotors) that spin by tightly wound copper wire (stator) which generates electricity. Electricity is transferred by wire up the arm to shore.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and, relative rotation between the elements is not possible. Radial and/or axial movement of non-rotatably connected elements with respect to each other is possible, but not required. By "rotatably connected" elements, we mean that: the elements are rotatable with respect to each other; and, whenever one element is displaced radially and/or axially, all the elements are displaced radially and/or axially.

Figure 1:
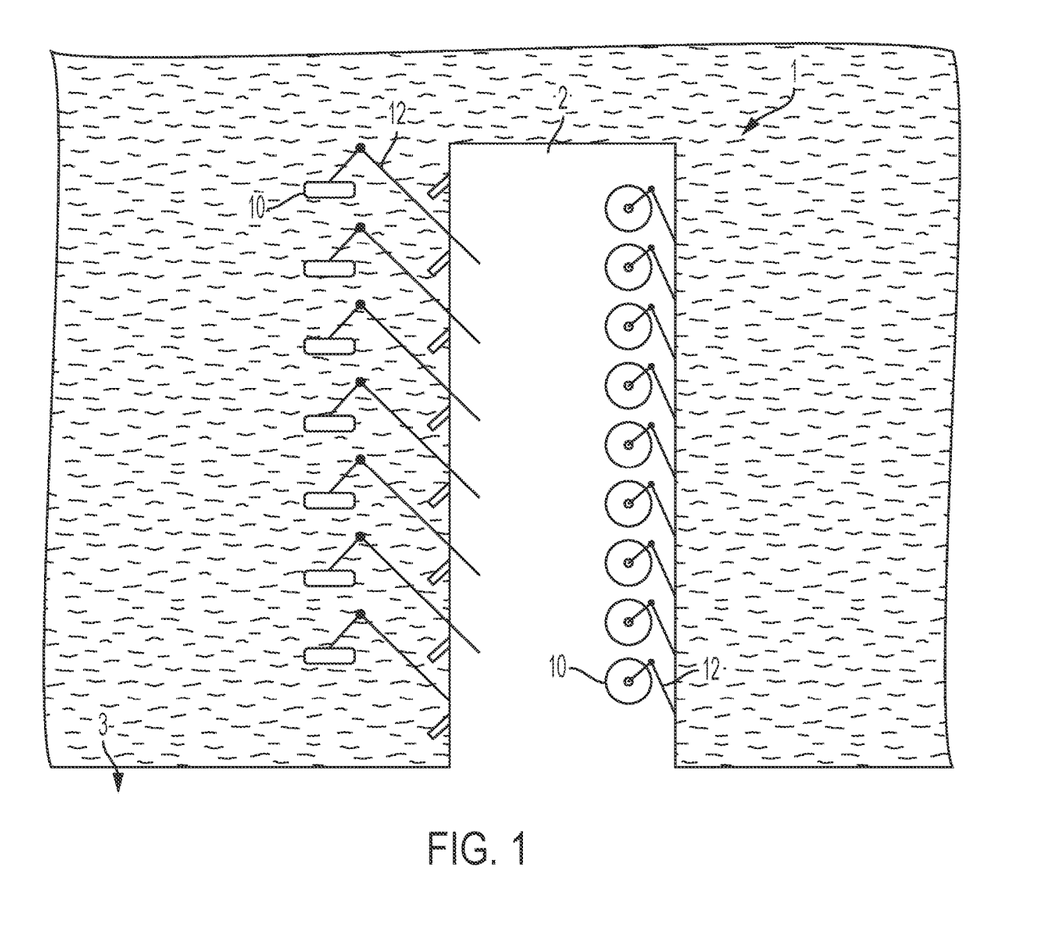
FIG. 1 is a top perspective view of energy capture and storage devices arranged on a pier.

Adverting now to the figures, FIG. 1 is a top perspective view of a plurality of energy capture and storage devices, or devices 10, arranged on pier or dock 2. As shown, devices 10 arranged on the left side of pier 2 are in the deployed position and are engaged with water 1. Devices 10 arranged on the right side of pier 2 are in the retracted position and are not engaged with water 1. Arms or booms 12 allow devices 10 to be deployably connected to pier 2. By deployably connected it is meant that devices 10 may be extended out into water 1 or retracted back onto pier 2. For example, devices 10 may be retracted back onto pier 2 when maintenance is required. This feature allows for easy serviceability and repair of devices 10. Once ready for use, devices 10 can then be deployed back into water 1.

Pier 2 is shown extending from shore 3 into water 1. It should be appreciated that devices 10 can be deployably connected to any structure, whether connected to shore 3 or not. For example, devices 10 may be deployably connected to a boat, raft, or barge, or to the floor of the body of water in which they reside.

Figure 2:
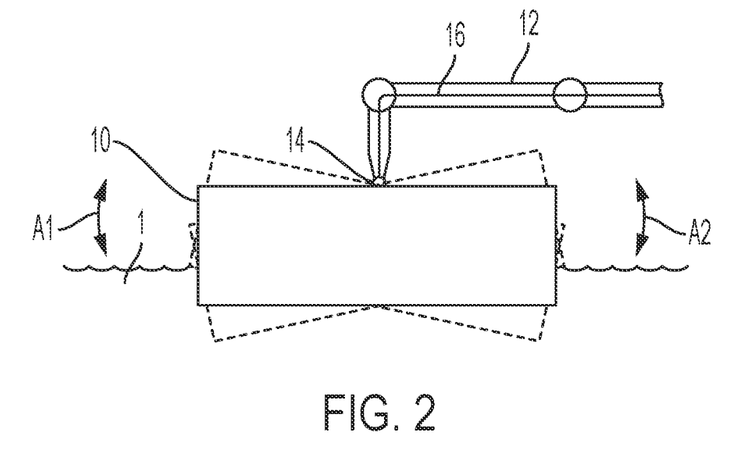
FIG. 2 is a side elevational view of an energy capture and storage device arranged in water.

FIG. 2 is a side elevational view of device 10 arranged in water 1. As shown, device 10 is deployed into water 1 by arm 12. Arm 12 is connected to device 10 via connection 14. In some embodiments, connection 14 allows pivotable connection of device 10 to arm 12 so as to allow for complete polyaxial movement. As water 1 moves (i.e., waves), device 10 pivotably displaces relative to arm 12, for example, as shown by arrow A1 and arrow A2. Any suitable polyaxial connection means may be used, for example, a ball and socket joint, a universal joint, etc. In some embodiments, wire 16 is connected to device 10 and extends through or along arm 12. Wire 16 is operatively arranged to transport energy (e.g., electrical energy) generated by device 10, for example, back to shore 3 and directly fed into the grid, or into an electrical energy storage device such as a battery.

Figure 3:
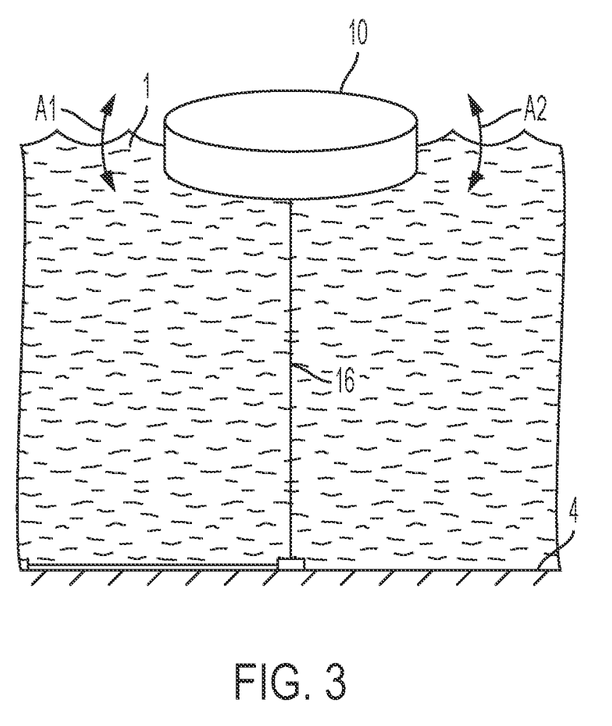
FIG. 3 is a side perspective view of an energy capture and storage device arranged in water.

FIG. 3 is a side perspective view of device 10 arranged in water 1. As shown, device 10 is deployed into water 1 and connected to floor 4 via wire 16. In some embodiments, device 10 is connected to floor 4 via any suitable means, for example, cable, chain, line, rope, belt, pipe, beam, strut, arm, etc. and wire 16 runs therethrough or therealong. Wire 16 is then directed to shore 3 or to a boat to transport electrical energy from device 10 to an energy storage device, such as a battery. The connection of device 10 to floor 4 allows for polyaxial displacement of device 10, for example, as shown by arrow A1 and arrow A2.

It should be appreciated that device 10 may be deployed in water 1 via any means suitable to allow polyaxial displacement of device 10 within water 1. It should also be appreciated that device 10 should be buoyant or at least partially buoyant. In the embodiment shown in FIGS. 1-2, device 10 should be at least partially buoyant such that movement of water 1 causes polyaxial displacement of device 10. In the embodiment shown in FIG. 3, device 10 should be completely buoyant such that it remains on or proximate to the surface of water 1. In some embodiments, device 10 may be deployed on land and connected to a wing, blade, airfoil, windsock, or other mechanism used to be displaced by wind. As the wind interacts with the wing, it causes device 10 to displace in a polyaxial direction.

Figure 4:
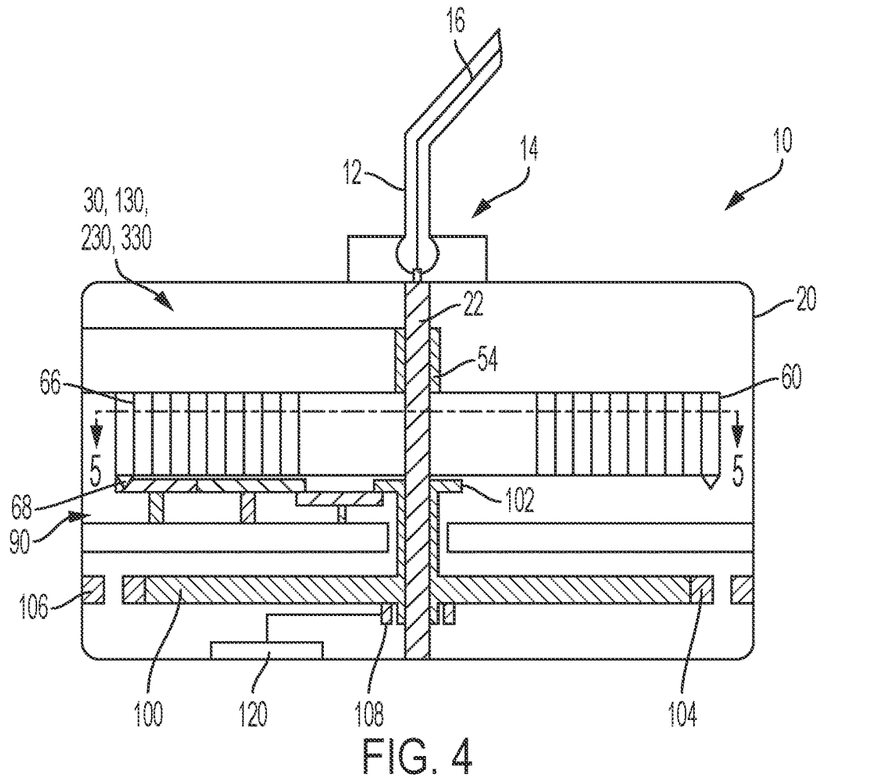
FIG. 4 is a partial cross-sectional schematic view of an energy capture and storage device.

FIG. 4 is a partial cross-sectional schematic view of device 10. As shown, device 10 generally comprises float or housing 20, oscillating weight assembly 30, 130, 230, 330, case 60, rotor 100, and stator 106. In some embodiments, device 10 further comprises gear train 90. In some embodiments, device 10 further comprises brake 108. In some embodiments, device 10 further comprises computer or computing device 120.

Housing 20 encloses all of the elements of device 10 therein. Housing 20 should be waterproof and at least partially buoyant. For example, housing 20 may float in water 1 on its own or partially float in water 1 via assistance from arm 12. Housing 20 is connected to arm 12 via polyaxial connection 14. As shown in FIG. 4, polyaxial connection 14 comprises a ball and socket joint. Wire 16 is connected to device 10 or an element therein and is operatively arranged to transport electrical energy created by rotor 100 and stator 106 to a remote location, for example, a battery on a boat or shore 3. Shaft 22 is fixedly secured (i.e., non-rotatably connected) to housing 20. In some embodiments, shaft 22 extends the entire height of housing 20 and is operatively arranged to support various components therein, as will be described in greater detail below.

Oscillating weight assembly 30, 130, 230, 330 is operatively arranged to rotate shaft 54 in a single circumferential direction. Shaft 54 is non-rotatably connected to oscillating weight assembly 30, 130, 230, 330 and spring 70 of case 60, as will be described in greater detail below. In some embodiments, oscillating weight assembly 30, 130, 230, 330 and shaft 54 may be rotatably connected to shaft 22. In some embodiments, oscillating weight assembly 30, 130, 230, 330 and shaft 54 are not connected to shaft 22. It should be appreciated that oscillating weight assembly 30, 130, 230, 330 is operatively arranged to rotate shaft 54 and wind spring 70 within case 60. Thus, as oscillating weight assembly 30, 130, 230, 330 rotates shaft 54 it winds spring 70 thereby increasing potential and kinetic energy of device 10.

Figure 5:
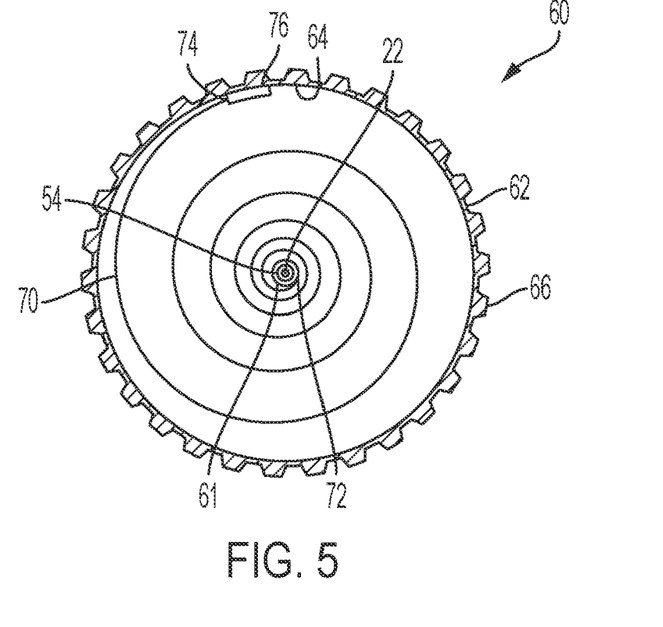
FIG. 5 is a cross-sectional schematic view of the case taken generally along line 5-5 in FIG. 4.

FIG. 5 is a cross-sectional schematic view of case 60 taken generally along line 5-5 in FIG. 4. Case 60 is generally cylindrical and comprises hole 61, radially outward facing or outer surface 62, and radially inward facing or inner surface 64. Spring 70 is arranged in case 60, specifically, within inner surface 64. Spring 70 comprises proximal end 72 fixedly secured to shaft 54 and distal end 74 connected to case 60. In some embodiments, distal end 74 is connected to case 60, specifically, inner surface 64, via clutch mechanism or clutch 76. Clutch 76 is, for example, a friction clutch or electromagnetic clutch employed between the distal end 74 and case 60 to prevent excessive spring tension of spring 70 and/or damage to spring 70. For example, if tension in spring 70 exceeds a predetermined threshold, clutch 76 may disconnect end 74 from inner surface 64 thereby releasing tension in spring 70. It should be appreciated that any suitable clutch may be used. In some embodiments, clutch 76 is controlled by computing device 120. For example, computing device 120 monitors the tension in spring 70 (e.g., via a sensor) and, after the tension exceeds a predetermined threshold, disengages clutch 76. Once the tension in spring 70 is less than or equal to the predetermined threshold, computing device 120 engages clutch 76 thereby reconnecting distal end 74 to inner surface 64. In some embodiments, proximal end 72 is connected to shaft 54 via a clutch for the same purpose as clutch 76.

Case 60 is rotatably connected to shaft 22. Case 60 is also rotatably connected to shaft 54. In some embodiments, shaft 54 extends through hole 61 in case 60 and is non-rotatably connected to spring 70. Case 60 is operatively arranged to rotate and circumferentially displace rotor 100 relative to stator 106. As spring 70 is wound within case 60 (i.e., via shaft 54), tension within spring 70 causes case 60 to circumferentially displace. Case 60 is non-rotatably connected to rotor 100 such that, as case 60 displaces circumferentially, rotor 100 displaces circumferentially.

In some embodiments, case 60 comprises a plurality of teeth operatively arranged to engage rotor 100. For example, in some embodiments, case 60 comprises radially extending teeth 66 arranged on outer surface 62 (see FIG. 5). In some embodiments, case 60 comprises axially extending teeth 68 arranged on a bottom surface thereof (see FIG. 4). In some embodiments, teeth 66, 68 directly engage teeth arranged on rotor 100. In some embodiments, teeth 66, 68 engage gear train 90. Gear train 90 is a mechanical system comprising one or more gears mounted on a frame so the teeth of the gears engage. As is apparent to those having ordinary skill in the art, gear train 90 should comprise a suitable number of gears or wheels to efficiently transfer rotational energy from case 60 to rotor 100 without, for example, allowing case 60 to quickly, or instantly, unload tension in spring 70. The purpose of gear train 90 is to transform slow rotation of case 60 into fast rotation of rotor 100. In some embodiments, and as shown, gear train 90 is fixedly secured to housing 20.

Rotor 100 is rotatably connected to shaft 22 and non-rotatably connected to gear train 90 and case 60. In some embodiments, rotor 100 comprises gear or wheel 102. Gear 102 is non-rotatably connected to rotor 100 and gear train 90. Thus, when case 60 rotates, gear train 90, gear 102, and rotor 100 also rotate. In some embodiments rotor 100 comprises magnet or magnets 104 arranged on or proximate its radially outward facing surface. Magnet 104 displaces circumferentially relative to stator 106. Stator 106 is fixedly secured to housing 20. As is known in the art, rotation of rotor 100, and magnet 104, with respect to stator 106, creates electricity. Specifically, stator 106 converts the rotating magnetic field created by rotor 100 and magnet 104 to electrical current. This electrical current is transferred via wire 16 to a remote location.

Brake 108 is operatively arranged to engage rotor 100 to regulate the angular velocity of rotor 100. Brake 108 may engage rotor 100 to slow it down. In some embodiments, the angular velocity of rotor 100 should be maintained at around 1,000 to 1,800 revolutions per minute (RPM). Thus, when the angular velocity of rotor 100 exceeds 1,800 RPM, brake 108 engages rotor 100. When the angular velocity of rotor 100 is less than or equal to 1,800 RPM, brake 108 disengages rotor 100. In some embodiments, brake 108 is an electromagnetic brake. In some embodiments, brake 108 is controlled by computing device 120. Computing device 120 is operatively arranged to monitor the angular velocity of rotor 100 (e.g., via a sensor), and engage or disengage brake 108 based thereon.

Figure 6:
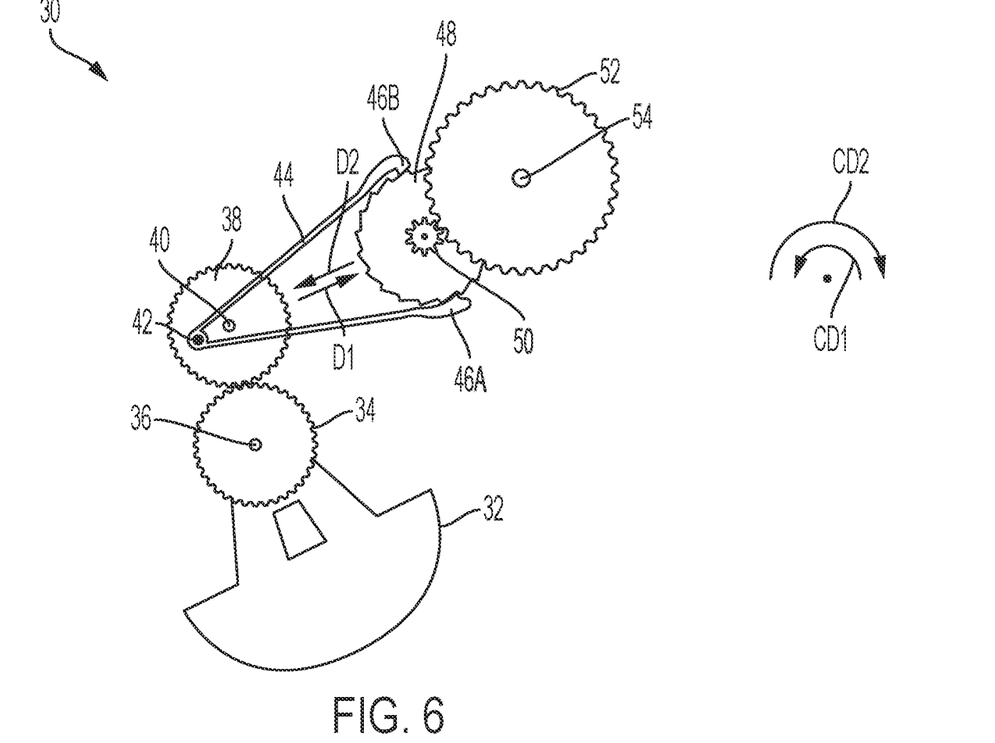
FIG. 6 is a elevational view of an oscillating or rotating weight assembly.

FIG. 6 is a elevational view of oscillating or rotating weight assembly 30.

Oscillating weight assembly 30 generally comprises oscillating or rotating weight 32, arm 44, and gear or wheel 48. In some embodiments, oscillating weight 32 is non-rotatably connected to gear or wheel 34 and both gear 34 and oscillating weight 32 rotate about shaft 36. Gear or wheel 38 is non-rotatably connected to gear 34, for example, via teeth. Thus, as gear 34 rotates so does gear 38. Gear 38 rotates about shaft 40.

Arm 44 is pivotably connected to gear 38 at connection point 42. Connection point 42 should be arranged at a location radially between shaft 40 and the radially outward facing surface of gear 38 such that rotation of gear 38 causes arm 44 to undergo "strokes." For example, displacement of gear 38 from rotation of oscillating weight 32 causes arm 44 to displace generally in direction D1 and direction D2. The first stroke occurs when arm 44 moves toward gear 48 in direction D1 and the second stroke occurs when arm 44 moves away from gear 48 in direction D2. As is shown, arm 44 comprises portions 46A-B which engage teeth on gear 48 such that gear 48 is rotatably displaced as arm 44 is displaced. For example, as arm 44 is displaced in direction D1, portion 46A pushes the teeth of gear 48 such that gear 48 displaces in circumferential direction CD1. As arm 44 is displaced in direction D2, portion 46B pulls the teeth of gear 48 such that gear 48 displaces in circumferential direction CD1. As such, arm 44 acts to constantly rotate gear 48 in circumferential direction CD1 no matter the rotational direction of gear 38, gear 34, or oscillating weight 32. As long as oscillating weight 32 is being displaced circumferentially (i.e., from movement of housing 20 in water 1), whether in circumferential direction CD1 or circumferential direction CD2, arm 44 is displacing gear 48 in circumferential direction CD1. It should be appreciated that in some embodiments arm 44 may be connected directly to gear 34, as shown in FIG. 7 and described below.

In some embodiments, gear 48 comprises pinion 50 which is non-rotatably connected to gear or wheel 52, for example, via teeth. Gear 52 is non-rotatably connected to shaft 54. It should be appreciated that in some embodiments, gear 48 is directly non-rotatably connected to shaft 54 and there is no need for gear 52. It should also be appreciated that while non-rotatable connection between the various gears is envisioned using engagement of teeth, other suitable connecting means may be used, for example, belts (i.e., to connect wheels or pullies).

Figure 7:
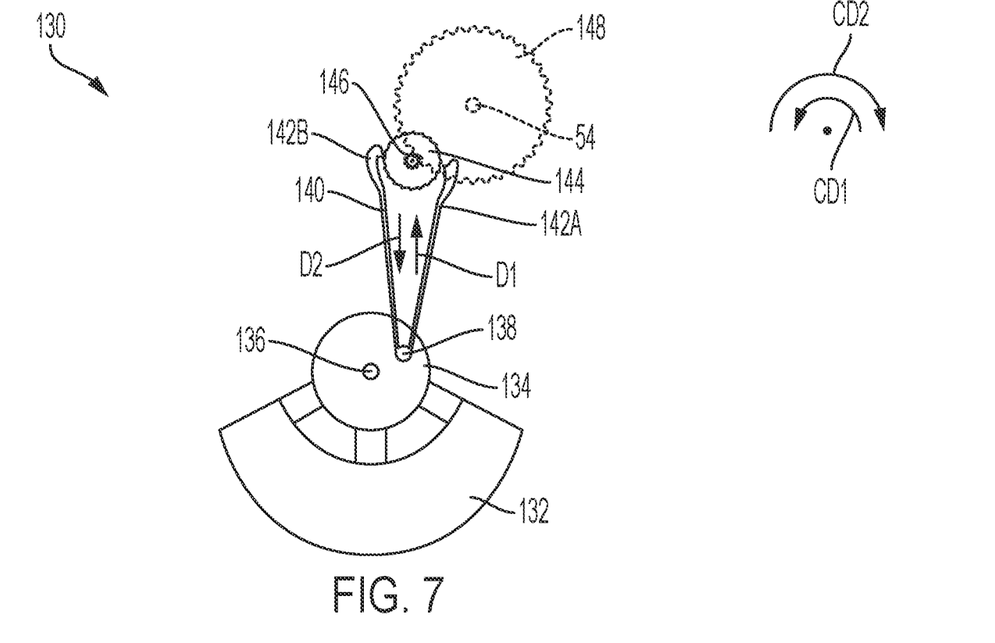
FIG. 7 is a elevational view of an oscillating or rotating weight assembly.

FIG. 7 is a elevational view of oscillating or rotating weight assembly 130. Oscillating weight assembly 130 generally comprises oscillating or rotating weight 132, arm 140, and gear or wheel 144. In some embodiments, oscillating weight 132 is non-rotatably connected to wheel or gear 134 and both wheel 134 and oscillating weight 132 rotate about shaft 136.

Arm 140 is pivotably connected to wheel 134 at connection point 138. Connection point 138 should be arranged at a location radially between shaft 136 and the radially outward facing surface of wheel 134 such that rotation of wheel 134 causes arm 140 to undergo strokes, or general displacement in direction D1 and D2, as described above with respect to FIG. 6 (i.e., displacement of wheel 134 from rotation of oscillating weight 132 causes arm 140 to displace generally in direction D1 and direction D2). As is shown, arm 140 comprises portions 142A-B which engage teeth on gear or wheel 144 such that gear 144 is rotatably displaced as arm 140 is displaced. For example, as arm 140 is displaced in direction D1, portion 142A pushes the teeth of gear 144 such that gear 144 displaces in circumferential direction CD1. As arm 140 is displaced in direction D2, portion 142B pulls the teeth of gear 144 such that gear 144 displaces in circumferential direction CD1. As such, arm 140 acts to constantly rotate gear 144 in circumferential direction CD1 no matter the rotational direction of wheel 134 or oscillating weight 132. As long as oscillating weight 132 is being displaced circumferentially (i.e., from movement of housing 20 in water 1), whether in circumferential direction CD1 or circumferential direction CD2, arm 140 is displacing gear 144 in circumferential direction CD1.

In some embodiments, gear 144 comprises pinion 146 which is non-rotatably connected to gear or wheel 148, for example, via teeth. Gear 148 is non-rotatably connected to shaft 54. It should be appreciated that in some embodiments, gear 144 is directly non-rotatably connected to shaft 54 and there is no need for gear 148. It should also be appreciated that while non-rotatable connection between the various gears is envisioned using engagement of teeth, other suitable connecting means may be used, for example, belts (i.e., to connect wheels or pullies).

Figure 8:
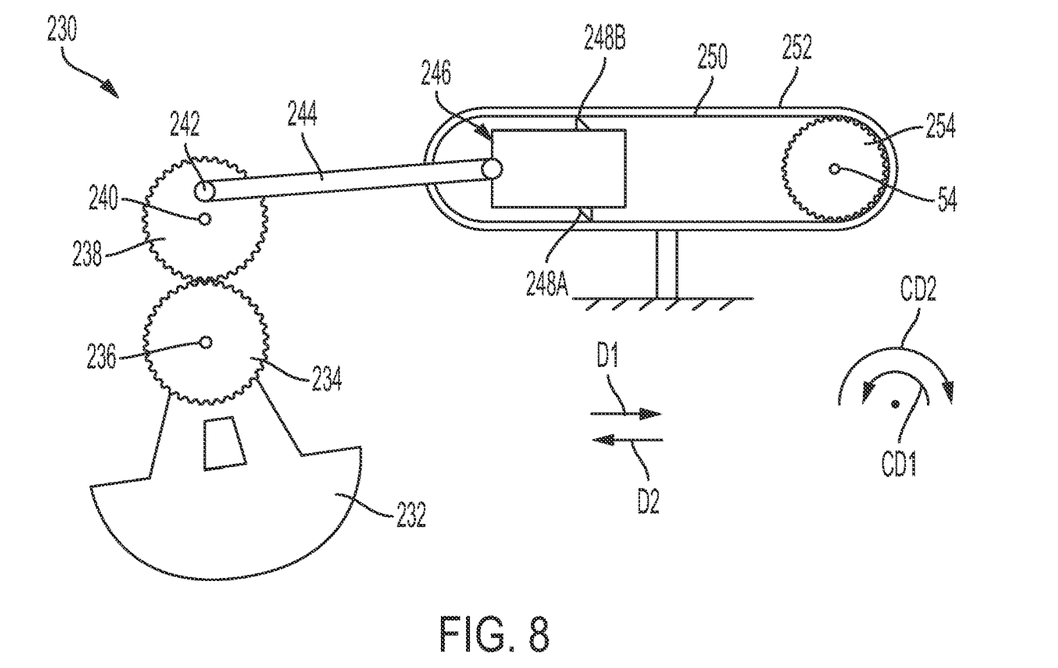
FIG. 8 is a elevational view of an oscillating or rotating weight assembly; and, FIG. 9 is a elevational view of an oscillating or rotating weight assembly.

FIG. 8 is a elevational view of oscillating or rotating weight assembly 230. Oscillating weight assembly 230 generally comprises oscillating or rotating weight 232, arm 244, reciprocating element 246, and chain or line 250. In some embodiments, oscillating weight 232 is non-rotatably connected to wheel or gear 234 and both wheel 234 and oscillating weight 232 rotate about shaft 236. Gear or wheel 238 is non-rotatably connected to gear 234, for example, via teeth. Thus, as gear 234 rotates so does gear 238. Gear 238 rotates about shaft 240.

Arm 244 is pivotably connected to gear 238 at connection point 242. Connection point 242 should be arranged at a location radially between shaft 240 and the radially outward facing surface of gear 238 such that rotation of gear 238 causes arm 244 to undergo strokes, or general displacement in direction D1 and D2, as described above with respect to FIGS. 6-7 (i.e., displacement of gear 236 from rotation of oscillating weight 232 causes arm 244 to displace generally in direction D1 and direction D2). As is shown, arm 244 is pivotably connected to reciprocating element 246 which engages chain 250. Specifically, reciprocating element 246 comprises pawls 248A-B that engage chain 250. Pawls 248A-B are hingedly connected to reciprocating element 246.

As reciprocating element 246 is displaced in direction D1, pawl 248A engages chain 250 and chain 250 is displaced in circumferential direction CD1 (i.e., counterclockwise in FIG. 8). Also as reciprocating element 246 is displaced in direction D1, pawl 248B disengages chain 250 by displacing in circumferential direction CD1 (i.e., folds down into reciprocating element 246). As reciprocating element 246 is displaced in direction D2, pawl 248B flips back up in circumferential direction CD2 and engages chain 250, and chain 250 is displaced in circumferential direction CD1 (i.e., counterclockwise in FIG. 8). Also as reciprocating element 246 is displaced in direction D2, pawl 248A disengages chain 250 by displacing in circumferential direction CD2 (i.e., folds up into reciprocating element 246). As such, arm 244 and reciprocating element 246 act to constantly rotate chain 250 in circumferential direction CD1 no matter the rotational direction of gear 234, gear 238, or oscillating weight 232. As long as oscillating weight 232 is being displaced circumferentially (i.e., from movement of housing 20 in water 1), whether in circumferential direction CD1 or circumferential direction CD2, arm 244 and reciprocating element 246 displaces chain 250 in circumferential direction CD1. It should be appreciated that in some embodiments arm 244 may be connected directly to gear 234, and intermediate gear 238 is not required.

In some embodiments, chain 250 is non-rotatably connected to gear or wheel 254, for example, via teeth. Gear 254 is non-rotatably connected to shaft 54. Chain 250 is held in position by external housing 252. Housing 252 prevents links of chain 250 from flexing outward and disengaging gear 254. In some embodiments, chain 250 comprises a rigid chain, for example, a SERAPID® rigid chain, that does not require an external housing because the links of the chain will not flex. It should be appreciated that in some embodiments, chain 250 is directly non-rotatably connected to shaft 54 and there is no need for gear 254. It should also be appreciated that while non-rotatable connection between the various gears is envisioned using engagement of teeth, other suitable connecting means may be used, for example, belts (i.e., to connect wheels or pullies).

Figure 9:
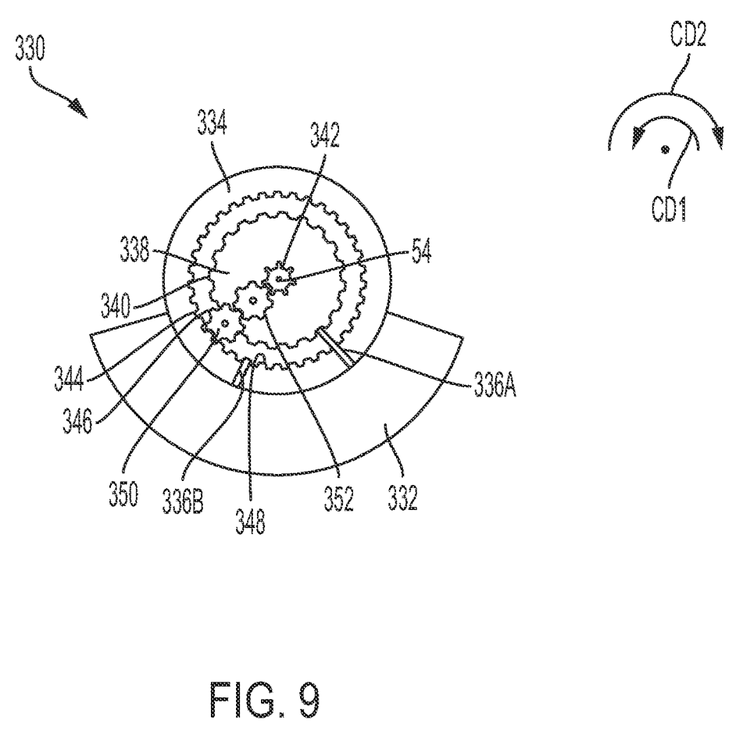

FIG. 9 is a elevational view of oscillating or rotating weight assembly 330. Oscillating weight assembly 330 generally comprises oscillating or rotating weight 332, pawls 336A-B, gear or wheel 338, pinion or gear 342, sun gear 344, and gear 350. Gear 338, pinion 342, and shaft 54 are non-rotatably connected. In some embodiments, oscillating weight 332 is non-rotatably connected to wheel or gear 334 and both wheel 334 and oscillating weight 332 rotate about shaft 54 (i.e., oscillating weight 332 and wheel 334 are rotatably connected to shaft 54).

Pawl 336A is hingedly connected to a radially inward facing surface of oscillating weight 332 and engages teeth 340 on gear 338. Pawl 336B is hingedly connected to a radially inward facing surface of oscillating weight 332 and engages external teeth 346 on sun gear 344.

When oscillating weight 332 displaces in circumferential direction CD1, pawl 336A engages teeth 340 on gear 338 and gear 338 is displaced in circumferential direction CD1. Also when oscillating weight 332 displaces in circumferential direction CD1, pawl 336B displaces in circumferential direction CD1 (i.e., folds down into oscillating weight 332) and disengages external teeth 346 on gear 344. When oscillating weight 332 displaces in circumferential direction CD2, pawl 336B flips back up (i.e., rotates in circumferential direction CD2) and engages external teeth 346 on gear 344 thereby rotating gear 344 in circumferential direction CD2. Internal teeth 348 engage teeth on gear 350. Gear 350 is non-rotatably connected with both gear 344 and gear 352. Gear 352 is non-rotatably connected to pinion 342. As such, as gear 344 rotates in circumferential direction CD2, pinion 342 is displaced in circumferential direction CD1. Also when oscillating weight 332 displaces in circumferential direction CD2, pawl 336A disengages teeth 340 on gear 338 and displaces in circumferential direction CD2 (i.e., folds down into oscillating weight 332). Gear 338 is non-rotatably connected to shaft 54.

As such, pawls 336A-B act to constantly rotate gear 338, and thus shaft 54, in circumferential direction CD1 no matter the rotational direction of wheel 334 or oscillating weight 332. As long as oscillating weight 332 is being displaced circumferentially (i.e., from movement of housing 20 in water 1), whether in circumferential direction CD1 or circumferential direction CD2, pawls 336A-B displace gear 338 and thus shaft 54 in circumferential direction CD1. It should be appreciated that, while FIG. 9 shows three intermediates gear (i.e., gears 344, 350, and 352), any number of intermediate gears suitable for constantly displacing gear 338 in circumferential direction CD1 independent on displacement of oscillating weight 332 may be used.

In some embodiments, oscillating weight assembly 330 comprises one or more biasing elements operatively arranged to bias pawls 336A-B into proper engagement. For example, pawl 336A may comprise a biasing element that biases pawl 336A in circumferential direction CD1. Pawl 336B may comprise a biasing element that biases pawl 336B in circumferential direction CD2. It should also be appreciated that while non-rotatable connection between the various gears is envisioned using engagement of teeth, other suitable connecting means may be used, for example, belts (i.e., to connect wheels or pullies). One benefit of oscillating weight assembly 330 is that oscillating weight 332, wheel 334, gear 338, and gear 344 are all concentrically arranged with shaft 54 (i.e., about a central axis). It should be appreciated that, in the embodiment shown in FIG. 9, pawl 336A and pawl 336B are arranged in different planes.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Water
2 Dock or pier
3 Shore
4 Floor
10 Energy capture and storage device or device
12 Arm or boom
14 Connection
16 Wire
20 Housing or float
22 Shaft
30 Oscillating or rotating weight assembly
32 Oscillating or rotating weight
34 Gear or wheel
36 Shaft
38 Gear or wheel
40 Shaft
42 Connection point
44 Arm
46A Portion
46B Portion
48 Gear or wheel
50 Pinion
52 Gear or wheel
54 Shaft
60 Case
61 Hole
62 Outer surface
64 Inner surface
66 Teeth
68 Teeth
70 Spring
72 Proximal end
74 Distal end
76 Clutch
90 Gear train or plurality of gears or wheels
100 Rotor
102 Gear or wheel
104 Magnet
106 Stator
108 Brake
120 Computer or computing device
130 Oscillating or rotating weight assembly
132 Oscillating or rotating weight
134 Gear or wheel
136 Shaft
138 Connection point
140 Arm
142A Portion
142B Portion
144 Gear or wheel
146 Pinion
148 Gear or wheel
230 Oscillating or rotating weight assembly
232 Oscillating or rotating weight
234 Gear or wheel
236 Shaft
238 Gear or wheel
240 Shaft
242 Connection point
244 Arm
246 Reciprocating element
248A Pawl
248B Pawl
250 Chain or line or belt
252 Housing
254 Gear or wheel
330 Oscillating or rotating weight assembly
332 Oscillating or rotating weight
334 Gear or wheel
336A Pawl
336B Pawl
338 Gear
340 Teeth
342 Pinion or gear
344 Gear
346 External teeth
348 Internal teeth
350 Gear
352 Gear
A1 Arrow
A2 Arrow
CD1 Circumferential direction
CD2 Circumferential direction
D1 Direction
D2 Direction

What is claimed is:

1. An energy capture, storage, and conversion device, comprising:
a housing;
a rotor rotatably arranged in the housing;
a stator fixedly secured to the housing and concentrically arranged around the rotor;
a spring arranged in the housing and connected to the rotor; and,
an oscillating weight assembly operatively arranged in the housing to wind the spring, the oscillating weight assembly including:
an oscillating weight;
a shaft connected to the spring;
a gear non-rotatably connected to the shaft;
an arm pivotably connected to the oscillating weight, the arm operatively arranged to displace the shaft in a first circumferential direction, wherein the arm comprises:
a first portion and a second portion spaced apart from the first portion, the first portion and the second portion are engaged with the gear to displace the shaft only in the first circumferential direction.

2. The device as recited in claim 1, further comprising a case arranged to at least partially enclose the spring, wherein the spring comprises a distal end connected to the case and a proximal end connected to the oscillating weight assembly.

3. The device as recited in claim 2, wherein the case is non-rotatably connected to the rotor.

4. The device as recited in claim 2, wherein the distal end is connected to the case via a clutch.

5. The device as recited in claim 2, further comprising a gear train operatively arranged to non-rotatably connect the case to the rotor.

6. The device as recited in claim 1, further comprising a brake operatively arranged to removably engage the rotor.

7. The device as recited in claim 6, further comprising a computing device operatively arranged to control the brake.

8. The device as recited in claim 1, wherein the housing is buoyant.

9. An energy capture, storage, and conversion device, comprising:
- a housing operatively arranged to float in water;
- a rotor rotatably arranged in the housing;
- a stator fixedly secured to the housing and concentrically arranged around the rotor;
- a case rotatably arranged in the housing, the case being non-rotatably connected to the rotor;
- a coil spring including a distal end connected to the case and a proximal end; and,
- an oscillating weight assembly arranged in the housing, the oscillating weight assembly being connected to the proximal end and operatively arranged to wind the spring, the oscillating weight assembly including:
  - an oscillating weight;
  - a plurality of gears including a first plurality of teeth and a second plurality of teeth;
  - a shaft connected to the spring;
  - a first pawl connected to the oscillating weight and operatively arranged to engage the first plurality of teeth to displace the shaft in a first circumferential direction; and,
  - a second pawl connected to the oscillating weight and operatively arranged to engage the second plurality of teeth to displace the shaft in the first circumferential direction.

10. The device as recited in claim 9, wherein the distal end is connected to the case via a clutch.

11. An energy capture, storage, and conversion device, comprising:
- a housing;
- a rotor rotatably arranged in the housing;
- a stator fixedly secured to the housing and concentrically arranged around the rotor;
- a spring arranged in the housing and connected to the rotor; and,
- an oscillating weight assembly operatively arranged in the housing to wind the spring, the oscillating weight assembly including:
  - an oscillating weight;
  - a shaft connected to the spring;
  - an arm pivotably connected to the oscillating weight, the arm operatively arranged to displace the shaft in a first circumferential direction;
  - a reciprocating element pivotably connected to the arm; and,
  - a chain non-rotatably connecting the reciprocating element to the shaft.

12. The device as recited in claim 11, wherein the reciprocating element comprises a first pawl and a second pawl engaged with the chain to displace the shaft only in the first direction.

* * * * *